United States Patent
Walls

[15] 3,662,446
[45] May 16, 1972

[54] LIGHTWEIGHT ROLL CONSTRUCTION

[72] Inventor: Harold D. Walls, White Twsp. Cty. of Ind., Pa.

[73] Assignee: McCreary Industrial Products Co., Indiana, Pa.

[22] Filed: Feb. 25, 1971

[21] Appl. No.: 118,907

[52] U.S. Cl. ................................................29/130, 29/132
[51] Int. Cl. ..............................................................B21b 31/08
[58] Field of Search ..........................29/132, 130, 116, 110

[56] References Cited

UNITED STATES PATENTS

| | | | |
|---|---|---|---|
| 1,386,427 | 8/1921 | Runge | 29/130 |
| 1,669,942 | 5/1928 | Linder | 29/130 X |
| 2,723,931 | 11/1955 | Mercer | 29/130 X |
| 2,804,678 | 9/1957 | Rockoff | 29/130 X |
| 2,863,175 | 12/1958 | Meyer | 29/121 R |

FOREIGN PATENTS OR APPLICATIONS

| | | | |
|---|---|---|---|
| 288,851 | 1/1967 | Australia | 29/132 |
| 191,613 | 1/1923 | Great Britain | 29/130 |

*Primary Examiner*—Alfred R. Guest
*Attorney*—Buell, Blenko & Ziesenheim

[57] ABSTRACT

The specification discloses a lightweight construction for rolls of the composite type employed in corrosive environments and other environments in which minimal weight or low inertia is a favorable factor. Various constructions are disclosed comprising a central core or shaft of fiber glass reinforced plastic or of steel having a protective coating or layer of fiber glass reinforced plastic, and a body of syntactic foam molded into a cylindrical form coaxial to the shaft and bonded thereto. A layer of fiber glass reinforced plastic surrounds the outer cylindrical surface of the body of foam and protects the annular ends of the roll. An outer abrasion protecting layer of elastomer material is bonded or otherwise secured to the outer cylindrical surface of the fiber glass plastic layer. The syntactic foam comprises nodules or spheres of glass, epoxy or phenolic material suspended in a matrix of thermosetting resin, in various degrees of density. One arrangement employs a matrix consisting of thermosetting resin and microspheres of glass, epoxy, phenolic or other material. Another arrangement employs a matrix of thermosetting resin with other reinforcing agents such as fibers of glass, boron, graphite, steel or asbestos. A further variation employs a matrix in which a blowing agent, such as azodicarbonomide is introduced into a thermosetting resin with an activator such as oxalic or acetic acid.

10 Claims, 8 Drawing Figures 3,662,446
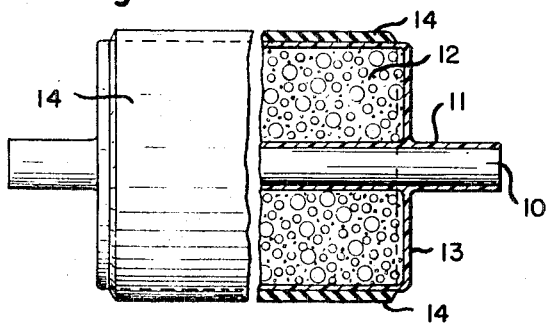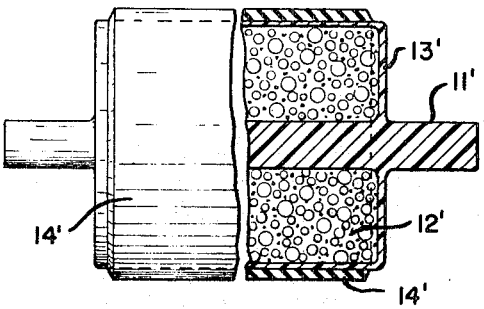
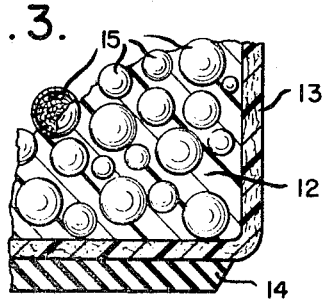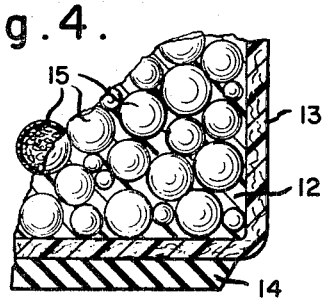
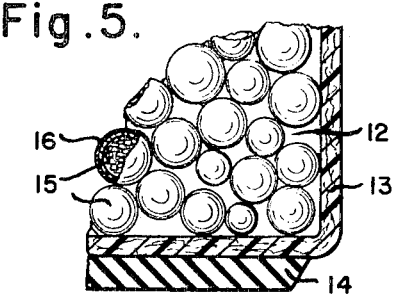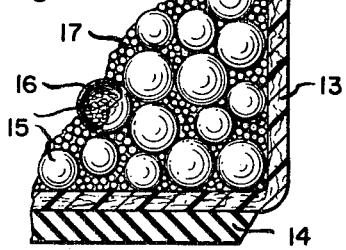
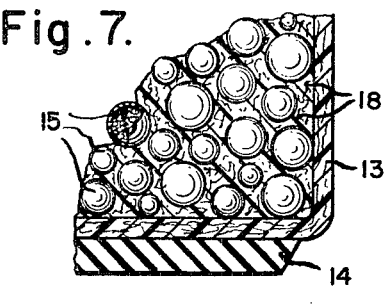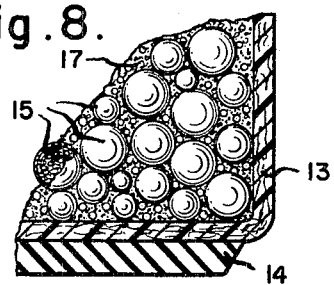
INVENTOR
Harold D. Walls

LIGHTWEIGHT ROLL CONSTRUCTION

Rolls of the type commonly and widely used in steel fabricating, paper making and other industries are subject to corrosive environments as a result of the use of various strong pickling or cleaning agents employed in the manufacturing process. Heretofore, rolls commonly employed in these industries consisted of hollow steel cylinders supported on steel shafts and coated with corrosion resistant material such as neoprene, acid-resistant rubber or other elastomeric material. While initially satisfactory for the purpose intended, rolls so coated unavoidably sustain damage to the neoprene coating which results in rupture of the coating and consequent access of the acid to the steel core of the roll. While there is a possibility of repair if detected soon enough, it frequently happens that the rolls are damaged beyond repair before the failure of the coating is detected.

Improved composite rolls have been proposed as for example that made in accordance with the process described and claimed in U.S. Pat. No. 3,520,747 to Robert S. McGaughey, assigned to the assignee of this invention. Such improved rolls provide on the core of steel or other structural material a corrosion resistant resin material reinforced with a mat or cloth of fibrous material, such as fiber glass, polyvinyl type fibers such as Dynel (polyvinyl chloride acrylonitrile copolymer), Orlon (polyacrylonitrile), polyester fiber such as Dacron, polyamide fiber such as nylon, or naturally occuring fibers such as asbestos and crocodilite (blue asbestos). A resilient elastomeric layer is bonded to the outer surface of the roll to provide additional abrasion resistant protection.

More recently an improved roll construction of lightweight construction compared to prior known rolls has been proposed, as disclosed and claimed in the copending application Ser. No. 771,407, filed Oct. 29, 1968 by Leonard S. Meyer and assigned to the assignee of this invention. The roll construction of the said application employs a reinforced cylindrical plastic shell structure supported on a coaxial core or shaft by annular end discs and one or more intervening axially spaced discs or bulkheads providing longitudinal support for the cylindrical plastic shell. With such construction, however, the outer cylindrical shell must of necessity be sufficiently thick to provide rigidity of the longitudinal sections bridging the axially spaced bulkheads or the bulkheads must be sufficiently closely spaced to provide longitudinal support for the cylindrical shell. In either case, the weight of the materials becomes a factor. Also, such rolls have a tendency to fill up with a processing fluid from an industrial processing line, in the event that some structural damage to the roll occurs which exposes the interior of the roll to such fluid. Moreover, the required assembly of multiple components and the relative complexity of the process of manufacture result in an unfavorably high cost of manufacture.

It is accordingly an object of the invention to obviate some of the disadvantages of the heretofore known rolls of the composite type, and to provide a lightweight roll construction of relative simplicity and low-cost for use in corrosive environments and in other environments and industries, such as aluminum and copper foil processing where lightweight and low inertia of the roll are favorable factors to be considered.

In the accomplishment of the above object there is provided, in accordance with the invention, an improved lightweight roll construction employing a shaft or core of steel covered with a coating of fiber glass reinforced plastic, or a shaft wholly constituted of fiber glass reinforced plastic or other material structurally sufficient in strength to withstand the physical loads imposed thereon, surrounded by a body of syntactic foam which is bonded to the shaft and molded in the form of a cylinder coaxial to the shaft. The body of foam is, in turn, surrounded by a layer of fiber glass reinforced plastic bonded thereto, and an abrasion resistant covering of elastomeric material is bonded to the outer cylindrical surface of the fiber glass reinforced plastic layer. The syntactic foam comprises nodules or spheres of glass, epoxy, or phenolic material suspended or mixed in a matrix of thermosetting resin in different selected degrees of density, depending on the environment in which the roll is to be used. One form of syntactic foam provided employs a matrix for the nodules consisting of a thermosetting resin and microspheres of glass, epoxy, phenolic, or other material. A variant form of foam provided employs a matrix consisting of a thermosetting resin having reinforcing agents, such as fibers of glass, boron, graphite, steel or asbestos. In another form of syntactic or composite foam, there is provided a blowing agent, such as azodicarbonomide, introduced into a thermosetting resin together with an activator such as oxalic or acetic acid. Alternatively, the matrix of integral foam may be a commercial foam system such as a polyol-diisocyanate blend which reacts to form an integral urethane foam.

The above objects, features and advantages of the invention, together with structural details thereof, will be elaborated upon in the forthcoming description of presently preferred embodiments of the invention, together with preferred methods for constructing the same.

In the accompanying drawings:

FIG. 1 is a fragmented elevational view, partially in section, showing one embodiment of the invention;

FIG. 2 is a fragmented elevational view, partially in section, showing a modification of the embodiment shown in FIG. 1;

FIG. 3 is a fragmental enlarged view of a portion of the roll as shown in either FIG. 1 or FIG. 2, depicting the detailed composition of one form of syntactic foam used therein;

FIG. 4 is a fragmental enlarged view of a portion of the roll as shown in either FIG. 1 or FIG. 2, depicting the detailed composition of another form of syntactic foam used therein;

FIG. 5 is a fragmental enlarged view of a portion of the roll as shown in either FIG. 1 or FIG. 2, and representing the detailed composition of another form of syntactic foam used therein; and FIGS. 6, 7 and 8 are fragmental enlarged views of a portion of the roll as shown in either FIG. 1 or FIG. 2, wherein the detailed composition of other forms of syntactic foam used therein are shown.

Referring to FIG. 1 of the drawings, the roll depicted therein comprises a shaft 10 of steel or other suitable metal, such as aluminum or bronze, a protective layer 11 of fiber glass reinforced plastic covering and bonded to the steel shaft, a body of syntactic or composite foam 12 surrounding and bonded to the protective layer 11 on the shaft, and a protective layer 13 of fiber glass reinforced plastic enclosing the body of foam and bonded to the foam as well as to the protective layer 11 on the shaft. An elastomeric layer 14 is bonded to the outside surface of layer 13 to provide protection against abrasion.

The protective layer 11 bonded to the shaft 10 is preferably of the order of one-eighth inch thickness. The protective layer 13 for the body of foam is preferably of the order of one-quarter inch thickness.

Referring to FIG. 2, the modification shown therein differs from that of FIG. 1, in that a shaft 11' wholly of fiber glass reinforced plastic and without a steel core is provided. In this instance the body of foam 12' and the protective layer 13' therefor are both bonded directly to the shaft 11' instead of to the protective layer, as in the embodiment of FIG. 1. Shaft 11' may be solid, as shown, or tubular if desired.

Referring now to FIGS. 3, 4 and 5, three different types of syntactic foam 12 are depicted respectively therein, differing essentially in the degree of density of one of the essential components, namely the basic nodule or sphere 15, as will be hereafter explained. The nodules 15 are made of some element suitable in strength and corrosion resistance to withstand the physical and chemical environment encountered by the roll, such as glass, epoxy and phenolic material. As an example, cellular glass spheres of foam one thirty-second to three-eighths inch in diameter may be employed. Such spheres may be produced by compacting glass powder together with an industrial blowing agent to form solid pellets, then heating such pellets to release the blowing agent (nitrogen, carbon dioxide or water vapor) while at the same time fusing together the particles of glass powder. The resulting glass nodules possess the inherent structural advantages of a spherical shape as well as the advantage of resistance to chemical action.

In FIGS. 3, 4 and 5, the syntactic foam 12 comprises nodules 15 suspended, supported, or mixed in a matrix of thermosetting resin. Any of the resins selected from the group of polyester, epoxy, phenolic or polyamide resins may be used as a matrix. In FIG. 3, the syntactic foam 12 comprises an excess of resin surrounding the nodules 15, that is, a larger proportion of resin in relation to the quantity of the nodules, so that the density of the nodules in the matrix of resin is a minimum. This relatively smaller density of nodules is represented by the greater spacing between the nodules 15 in FIG. 3, as compared to their density in FIGS. 4 and 5, wherein the greater density of the nodules is represented by the relatively closer spacing and the close physical contact of the nodules with one another. The foam 12 of FIG. 3 might well be used in rolls wherein the corrosion resistant qualities of the resin are a more important consideration than the light-weight or low-cost of the glass nodules.

The foam 12 of FIG. 4 represents a syntactic foam wherein the nodules are compacted into close contact with one another and the proportion of resin content is just sufficient to fill the spaces between the nodules.

The foam of FIG. 5 represents a syntactic foam wherein the proportion of resin content is just sufficient to provide a coat or layer 16 on each module to act as a binder, thereby leaving void or empty spaces among the nodules. Such a foam might well be used where light-weight and/or low-cost are an important consideration in the end product.

It will be understood that the foam shown in FIG. 4 represents one that is intermediate in cost, weight and physical strength compared to the foams respectively shown in FIGS. 3 and 5.

The foam of FIG. 6 is representative of one that may be of lesser weight and cost than those shown in FIGS. 3, 4 and 5. In this form of foam, the nodules having a coating 16 of resin are in close contact with one another and the void spaces surrounding the nodules are completely or substantially completely filled with so-called microspheres 17 of relatively smaller diameter than the nodules 15. In size, microspheres 17 may be in the range of 4 to 300 microns in diameter. The microspheres may be made of the same materials, heretofore mentioned, of which the nodules are made, and, in addition, may be made from saran (vinylidene chloride/acrylonitrile).

In FIG. 7 is shown a representation of a foam comprising nodules 15 suspended in a thermosetting resin in proportions, such as depicted in FIGS. 3 or 4, and further including one or more reinforcing agents, such as fibers 18 of glass, boron, graphite, steel or asbestos.

In FIG. 8 is shown a representation of a foam comprising nodules 15 and microspheres 17 suspended in a thermosetting resin matrix in which there is introduced a blowing agent such as azodicarbonamide with an activator such as oxalic acid or acetic acid. In lieu of the latter form of matrix, an alternate matrix may be employed comprising a commercial foam system such as a polyol-diisocyanate blend which reacts to form an integral urethane foam.

A preferred method for processing the component materials into the finished product of a lightweight roll may be employed as follows:

a. If a steel shaft or core is to be employed, it is first covered with a protecting coating of fiber glass reinforced plastic.
b. The coated shaft, or a shaft made wholly of fiber glass reinforced plastic, is suitably supported in a vertical position.
c. A wooden disc having a central hole, or other suitable centering device, is slipped over the shaft with the central hole conforming closely in diameter to that of the shaft and the circumferential periphery of the disc being concentric to the shaft. The disc is so positioned that its upper face provides the molding surface for one end of the roll.
d. A cylindrical sleeve mold of appropriate material closely conforming internally to the diameter of the disc is slipped over the disc and thereby supported coaxially to the shaft. A second disc conforming to the first disc may be slipped over the shaft and into the cylindrical sleeve mold at the top end, following the next step No. (e), to insure concentricity of the mold and the shaft. Alternatively, the cylindrical sleeve mold may constitute a preformed fiber glass reinforced plastic cylindrical sleeve which then is allowed to remain and provide the outer layer for the body of syntactic foam.
e. The necessary component materials in the syntactic foam desired are weighed according to the proportions desired, then mixed together and with the necessary catalyst or catalysts for polymerizing the thermosetting resin, in a low-shear mixer. Following the mixing operation, the mix of materials is poured into the cylindrical sleeve mold to substantially fill it therewith and the top supporting disc is then inserted over the shaft and into the top end of the cylindrical sleeve mold to maintain concentricity thereof with the shaft.
f. The molding apparatus is then placed in an oven and heated to a sufficient and appropriate temperature to initiate the polymerization process, following which the apparatus is post-cured in conventional manner. If a separate sleeve mold has been employed, the resultant molded product is now removed from the mold. If a cylindrical sleeve mold of fiber glass reinforced plastic has been employed, the end discs only are removed, thus leaving the molded product with an outer cylindrical layer of fiber glass reinforced plastic to which the body of syntactic foam is bonded.
g. The next step in the process involves covering the outer surface of the molded body of syntactic foam with a layer of fiber glass reinforced plastic by any suitable heretofore known method. If a cylindrical sleeve mold of fiber glass reinforced plastic is employed for the mold, it is necessary merely to cover the exposed annular ends of the molded body of syntactic foam with a layer of fiber glass reinforced plastic in such a manner as to bond to the coated shaft, or to the shaft itself, and to the cylindrical outer layer of fiber glass reinforced plastic surrounding the molded body of foam.
h. The final step in the process involves the application and bonding of the elastomeric layer to the outer cylindrical surface of the fiber glass reinforced plastic layer in a suitable or conventional manner, such as that described in the aforesaid McGaughey U.S. Pat. No. 3,520,747. Any suitable commercially available elastomer may be employed.

While the above method of producing the final product of a lightweight roll construction has been illustratively described herein, it will be apparent that some variations therein may be resorted to without departing from the basic procedure.

I claim:

1. A roll of lightweight construction for use in a corrosive environment, said roll comprising a shaft having an outer surface layer of fiber glass reinforced plastic, a body of syntactic foam molded in a cylindrical form coaxially surrounding said shaft and bonded to said surface layer, said outer surface layer underlaying said body and extending therebeyond, a second layer of fiber glass reinforced plastic covering said body of syntactic foam, and a layer of elastomeric material surrounding and bonded to said second layer of fiber glass reinforced plastic.

2. A roll according to claim 1, wherein said body of syntactic foam comprises a mix of nodules in a matrix of thermosetting resin, said nodules being of a material selected from the group of glass, epoxy or phenolic material.

3. A roll according to claim 1, wherein said body of syntactic foam comprises nodules suspended in a matrix of thermosetting resin, said nodules being of a material selected from the group of glass, epoxy or phenolic material.

4. A roll according to claim 1, wherein said body of syntactic foam comprises nodules in closely compacted contact and surrounded by a matrix of thermosetting resin, said nodules being of a material selected from the group of glass, epoxy or phenolic material.

5. A roll according to claim 1, wherein said body of syntactic foam comprises nodules in closely compacted contact with one another and individually coated with a layer of thermosetting resin, said nodules being of a material selected from the group of glass, epoxy or phenolic material.

6. A roll according to claim 1, wherein said body of syntactic foam comprises nodules made of a material selected from the group of glass, epoxy or phenolic material and ranging in diameter from one thirty-second to three-eighths inch, said nodules being in closely compacted contact with one another and individually coated with a layer of thermosetting resin and with void spaces interspersed thereamong, and microspheres substantially filling the said void spaces and being made of a material selected from the group of glass, epoxy or phenolic material and ranging in diameter from 4 to 300 microns.

7. A roll according to claim 1, wherein said body of syntactic foam comprises nodules in a matrix of thermosetting resin, said nodules being of a material selected from the group of glass, epoxy or phenolic material, and said resin containing a reinforcing agent selected from a group of materials comprising fibers of glass, boron, graphite, steel or asbestos.

8. A roll according to claim 1, wherein said body of syntactic foam comprises nodules and microspheres closely compacted in a thermosetting resin matrix containing a blowing agent with an activator.

9. A roll according to claim 1, wherein said body of syntactic foam comprises nodules and microspheres closely compacted in a thermosetting resin matrix containing azodicarbonamide and an activator selected from a group comprising oxalic acid or acetic acid.

10. A roll according to claim 1, wherein said body of syntactic foam comprises nodules and microspheres closely compacted in a matrix foam system comprising a polyol-diisocyanate blend which reacts to form a integral urethane foam.

* * * * *